US012192546B2

(12) United States Patent
McMurray et al.

(10) Patent No.: US 12,192,546 B2
(45) Date of Patent: Jan. 7, 2025

(54) DYNAMIC CONTENT DELIVERY

(71) Applicant: Comcast Cable Communications, LLC, Philadelphia, PA (US)

(72) Inventors: Ryan Lee McMurray, Denver, CO (US); Carl Veazey, Longmont, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/394,068

(22) Filed: Apr. 25, 2019

(65) Prior Publication Data

US 2020/0344510 A1    Oct. 29, 2020

(51) Int. Cl.
| | |
|---|---|
| *H04N 21/2343* | (2011.01) |
| *H04N 21/231* | (2011.01) |
| *H04N 21/24* | (2011.01) |
| *H04N 21/262* | (2011.01) |
| *H04N 21/2662* | (2011.01) |
| *H04N 21/658* | (2011.01) |
| *H04N 21/845* | (2011.01) |

(52) U.S. Cl.
CPC ........... *H04N 21/234309* (2013.01); *H04N 21/23109* (2013.01); *H04N 21/2402* (2013.01)

(58) Field of Classification Search
CPC ..... H04N 21/234309; H04N 21/23109; H04N 21/2402
USPC .......................................................... 725/95
See application file for complete search history.

(56) References Cited

U.S. PATENT DOCUMENTS

| | | | |
|---|---|---|---|
| 8,910,229 B2 | 12/2014 | Xu et al. | |
| 2004/0057461 A1 | 3/2004 | Dawidowsky et al. | |
| 2013/0007223 A1* | 1/2013 | Luby ..................... | H04L 65/604 709/219 |
| 2013/0042013 A1* | 2/2013 | Bouazizi .......... | H04N 21/26258 709/227 |
| 2013/0159546 A1* | 6/2013 | Thang .............. | H04N 21/23439 709/231 |
| 2014/0019593 A1* | 1/2014 | Reznik ............... | H04N 21/8456 709/219 |
| 2014/0040498 A1* | 2/2014 | Oyman ................. | H04W 24/02 709/231 |
| 2014/0149557 A1* | 5/2014 | Lohmar .................. | H04L 65/60 709/219 |
| 2015/0012584 A1* | 1/2015 | Lo ......................... | H04L 67/563 709/203 |
| 2015/0135246 A1* | 5/2015 | Dunne ............... | H04N 21/4347 725/109 |
| 2015/0163273 A1 | 6/2015 | Radcliffe et al. | |
| 2015/0319214 A1* | 11/2015 | Yu .......................... | H04L 67/63 709/219 |
| 2016/0073106 A1* | 3/2016 | Su ...................... | H04N 21/8456 375/240.02 |
| 2016/0127440 A1* | 5/2016 | Gordon ............. | H04N 21/8456 709/219 |
| 2016/0366202 A1 | 12/2016 | Phillips et al. | |

(Continued)

*Primary Examiner* — Hsiungfei Peng
(74) *Attorney, Agent, or Firm* — Banner & Witcoff, Ltd.

(57) ABSTRACT

Systems, apparatuses, and methods are described for providing updated manifests for content items. The updated manifests may present one or more expected characteristics for a given one or more segments of the content items. The device receiving the content item may use the updated manifests to select a representation of the content item or portion thereof.

18 Claims, 10 Drawing Sheets

(56) References Cited

U.S. PATENT DOCUMENTS

2017/0171287 A1* 6/2017 Famaey ................. H04L 65/65
2017/0353516 A1   12/2017 Gordon
2019/0342356 A1* 11/2019 Thomas ............. H04N 21/8458

* cited by examiner

| Segment Start Time (seconds) | Device 310 Available Bandwidth | Indicated by Manifest 308 | | | | | |
|---|---|---|---|---|---|---|---|
| | | Representation 1 | | Representation 2 | | Representation 3 | |
| | | Max Bandwidth | Fragment Length | Max Bandwidth | Fragment Length | Max Bandwidth | Fragment Length |
| 0 | 2 Mbps | 1 Mbps | 1 | 800 Kbps | 1 | 700 Kbps | 1 |
| 2 | 1.1 Mbps | 1.2 Mbps | 1 | 1 Mbps | 2 | 850 Kbps | 1 |
| 4 | 800 Kbps | 900 Kbps | 1 | 700 Kbps | 1 | 550 Kbps | 1 |
| 6 | 1 Mbps | 950 Kbps | 1 | 750 Kbps | 1 | 600 Kbps | 1 |
| 8 | 1 Mbps | 1.3 Mbps | 1 | 900 Kbps | 1 | 750 Kbps | 1 |
| 10 | 1 Mbps | 1.4 Mbps | 1 | 1.1 Mbps | 1 | 900 Kbps | 1 |
| 12 | 1.1 Mbps | 1.5 Mbps | 2 | 1.3 Mbps | 1 | 1.1 Mbps | 1 |
| 14 | 1.4 Mbps | 1.6 Mbps | 2 | 1.4 Mbps | 2 | 1.2 Mbps | 1 |
| 16 | 1.7 Mbps | 2.0 Mbps | 2 | 1.6 Mbps | 1 | 1.3 Mbps | 1 |
| 18 | 2 Mbps | 1.7 Mbps | 1 | 1.4 Mbps | 2 | 1.1 Mbps | 1 |
| 20 | 2.5 Mbps | 3.5 Mbps | 1 | 2 Mbps | 1 | 1.7 Mbps | 1 |
| 22 | 3 Mbps | 3.4 Mbps | 1 | 1.9 Mbps | 1 | 1.6 Mbps | 3 |
| 24 | 3.3 Mbps | 3.2 Mbps | 3 | 1.8 Mbps | 1 | 1.5 Mbps | 3 |
| 26 | 3.1 Mbps | 3 Mbps | 3 | 1.7 Mbps | 1 | 1.4 Mbps | 2 |
| 28 | 2.6 Mbps | 2 Mbps | 2 | 1.6 Mbps | 1 | 1.3 Mbps | 2 |
| 30 | 2.2 Mbps | 2.2 Mbps | 1 | 1.6 Mbps | 1 | 1.3 Mbps | 1 |

FIG. 9

DYNAMIC CONTENT DELIVERY

BACKGROUND

In varying bitrate video delivery approaches, such as adaptive bitrate (ABR) video delivery systems, data files are typically provided to a video player that provide information related to segments in a video. Such data files, e.g., manifest files, typically contain static bandwidth values for each transcoding variation of an item of video content. The values in a manifest file are typically static and are determined by the worst-case scenario—determining the one portion of the video content where the bandwidth is highest (maximum bandwidth) per each representation of the ABR content. However, the majority of the video content may not reach this maximum bandwidth. Still, the maximum bandwidth is used to determine the static bandwidth value in the manifest. This may result in player or client-side inefficiency. A player or client will determine its own available network bandwidth, and based on that value, the player or client will request a representation of the content as found in the manifest that does not exceed the player's or client's available bandwidth. However, because maximum bandwidth may be reached for only one or more short periods of time within a given representation of an item of content, the manifest may be misrepresenting the amount of bandwidth that is actually required to stream the vast majority of each representation of the item of content. This restricts the player or client device to selecting a representation based on the advertised maximum bitrate for an entire item of content. These and other deficiencies are discussed and addressed by the disclosure.

SUMMARY

The following summary presents a simplified summary of certain features. The summary is not an extensive overview and is not intended to identify key or critical elements.

Systems, apparatuses, and methods are described for providing dynamic, updated manifests for an item of content. The updated manifests may present one or more expected characteristics for each segment of the item of content, and may be based on one or more measurements such as an indication relating to video quality. One or more manifests may be updated throughout the item of content, such as on a segment-by-segment basis. Using updated characteristics that may be tailored to individual segments or groups of segments, the device receiving the content may be able to make better decisions when selecting which representation of the content to receive. The receiving device may be able to determine whether it has bandwidth to pre-fetch one or more future segments of one or more of the representations.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 9 shows an example of selected representations and transcoded segments.

DETAILED DESCRIPTION

Figure 1:
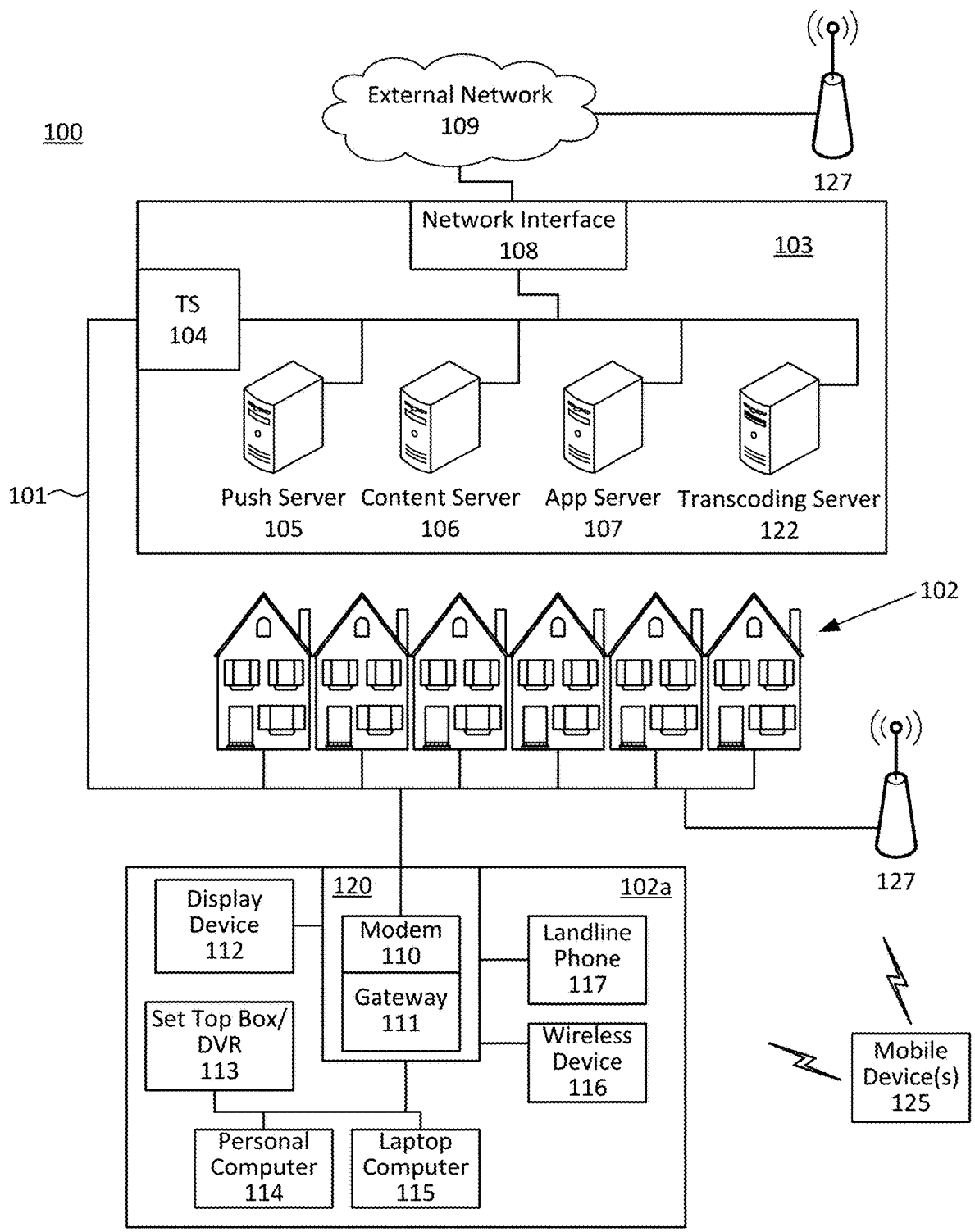
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows an example communication network 100 in which features described herein may be implemented. The communication network 100 may comprise one or more information distribution networks of any type, such as, without limitation, a telephone network, a wireless network (e.g., an LTE network, a 5G network, a WiFi IEEE 802.11 network, a WiMAX network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a cable modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and back-end devices such as servers 105-107 and/or 122, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, such as a transcoding server 122 (described below), additional push, content, and/or application servers, and/or other types of servers. Although shown separately, the push server 105, the content server 106, the application server 107, the transcoding server 122, and/or other server(s) may be combined. The servers 105, 106, 107, and 122, and/or other servers or other types of devices, may be computing devices and may comprise memory storing data and/or storing computer executable instructions that, when executed by one or more processors, cause the server(s) or other devices to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g. Voice over Internet Protocol—VoIP phones), and any other desired devices. Example types of local networks comprise Multimedia Over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102a, and/or other devices may receive, store, output, and/or otherwise use content items. A content item may comprise a video, a game, one or more images, software, audio, text, webpage(s), and/or other content.

Figure 2:
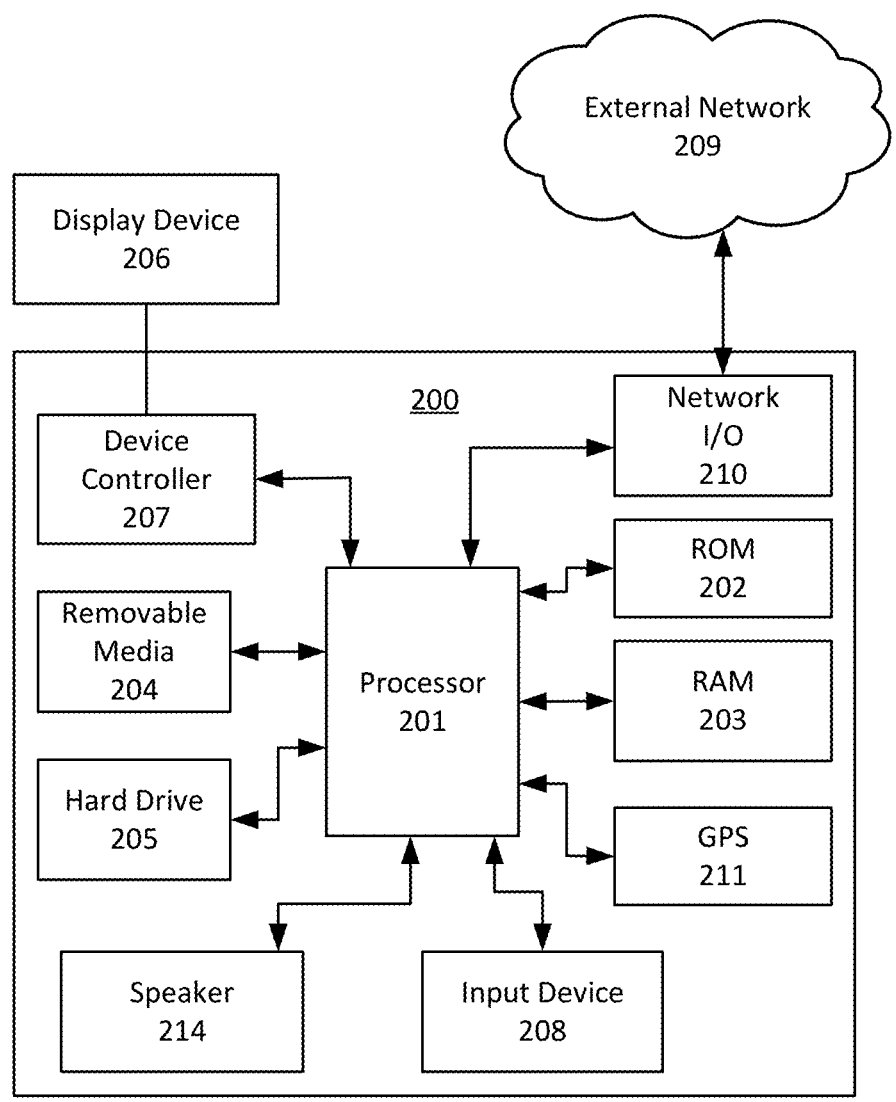
FIG. 2 shows example hardware elements of a computing device.
Figure 3:
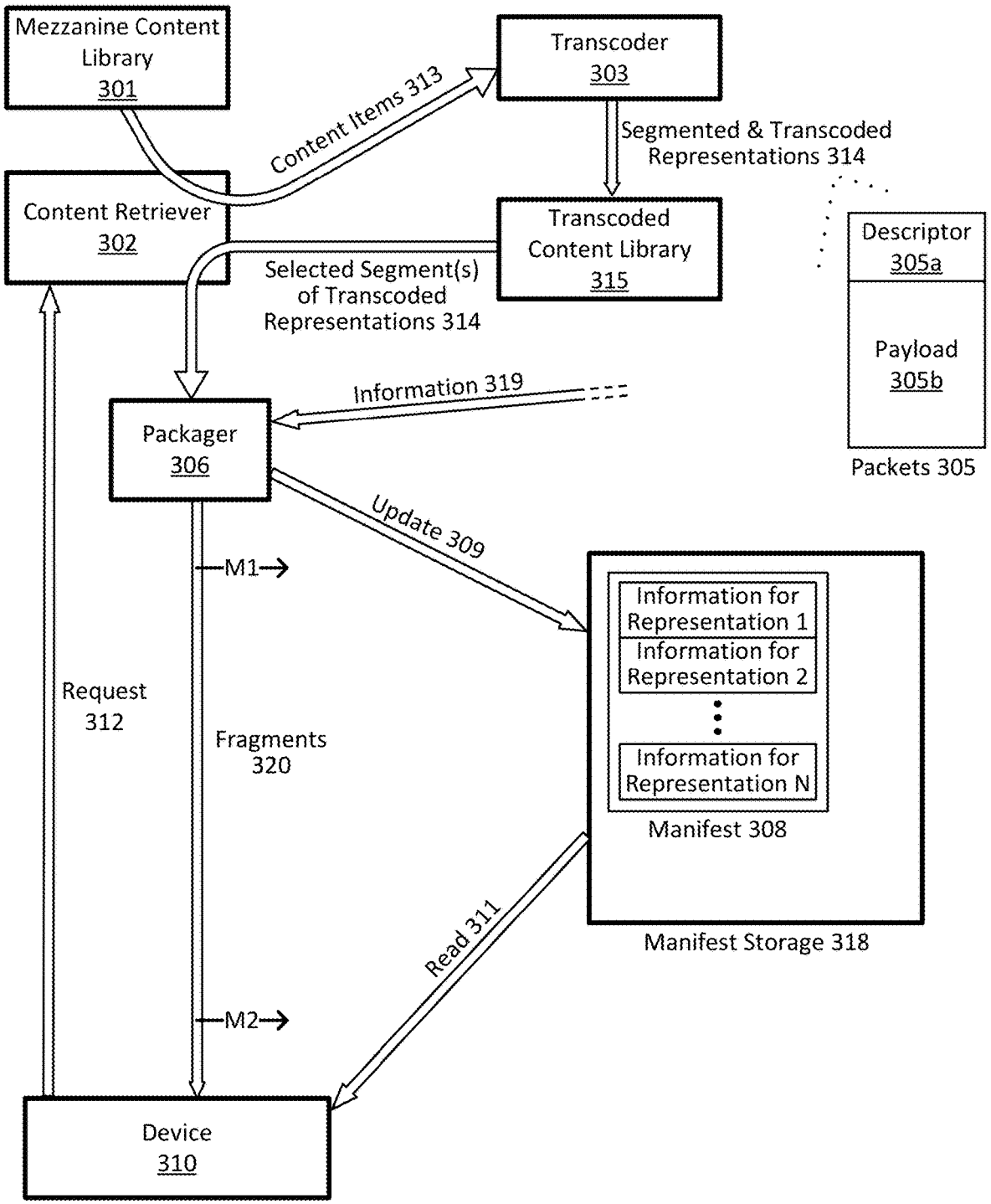
FIG. 3 shows an example of content and manifests being provided to a device.

FIG. 2 shows hardware elements of a computing device 200 that may be used to implement any of the computing devices shown in FIGS. 1 and 3 (e.g., the mobile devices 125, any of the devices shown in the premises 102a, any of the devices shown in the local office 103, any of the wireless access points 127, any devices with the external network 109, any of elements 301-303, 306, 310, 315, and 318, etc.) and any other computing devices discussed herein. The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer and/or perform any other functionality in support of any of the features described herein.

FIG. 3 shows an example block diagram of how content and manifests may be provided to one or more premises such as the premises 102a. In this example, content may be stored or otherwise accessible via a content library, referred to herein by way of example as a mezzanine content library 301. The content may comprise one or more content items 313, which may each be any type of content. For example, a content item may comprise multimedia content and/or may comprise video, audio, text, graphics, animation, subtitles, metadata, and/or other information. Examples of the content items 313 include a video program, movie, television show, advertisement, livestream, broadcast sporting event, and the like. A content item 313 may be of any length, e.g., about a half hour, about an hour, any length between those two lengths, or any length less than or greater than either of those two lengths.

The mezzanine content library 301 may organize and store one or more of the content items 313 via one or more storage devices that may be physically in the same location or that may be distributed across multiple locations. For example, the content items 313 of the mezzanine content library 301 may be stored in devices of one or more of the external networks 109, in devices of the local office (for example, in the content server 106), and/or in devices of the premises 102a (for example, in the gateway 111). The mezzanine content library 301 may also include or otherwise be in communication with one or more computing devices (for example, the content server 106, the application server 107, and/or the gateway 111), referred to herein as a content retriever 302, that handles various aspects of content item retrieval and/or delivery. Any of the blocks 301-303, 306, 310, 315, and 318 may be partially or fully implemented by any one or more devices, such as one or more data storage devices and/or one or more computing devices (e.g., one or more computing devices such as shown in FIG. 2). For example, any of the blocks 301-303, 306, 315, and/or 318 may be implemented, in whole or in part, by one or more of the interface 104, the push server 105, the content server 106, the application server 107, the transcoding server 122, the network interface 108, devices in the external network(s) 109, and/or the interface 120. The block 310 (e.g., a device, such as a client, that can receive content) may be implemented, in whole or in part, by one or more of the interface 120, the display device 112, the set top box/DVR 113, the personal computer 114, the laptop computer 115, the wireless device 116, the landline phone 117, the mobile device(s) 125, or any other computing device(s). Moreover, any of the blocks 301-303, 306, and/or 315 may be physically implemented by the same device(s) as others of the blocks 301-303, 306, 315, and/or 318, or subdivided into being implemented by multiple devices. For example, the content retriever 302 and the transcoder 303 may both be partially or fully implemented by the application server 107 (which itself may be physically made up of one or more computing devices). Or, the transcoder 303 and the packager 306 may be partially or fully implemented by the transcoding server 122, the application server 107, and/or the content server 106 (each of which may be physically made up of one or more computing devices).

In operation, the content retriever 302 may retrieve one or more of the content items 313 from the mezzanine content library 301, and pass those retrieved content items 313 to the transcoder 303. Each content item 313, as stored in the mezzanine content library 301, may or may not already be divided into a sequential time series of a plurality of segments. If not, or if a different division is desired, then the retrieved content items 313 may be divided into a sequential time series of a plurality of segments by the content retriever 302 and/or by the transcoder 303. A segment may be any portion of a content item. The transcoder 303 may then transcode each of the segments, of a content item from the mezzanine content library 301, into one or more transcoded versions (referred to herein by way of example as one or more representations 314) of each of the segments. The transcoder 303 may be configured to transcode each of the segments into any one or more of a plurality of formats, as desired. For example, the transcoder 303 may be able to transcode a segment into multiple different transcoded bitrates, multiple different levels of content quality (e.g., video quality), and/or multiple different data formats and/or streaming protocols (for example, AVC, HEVC, AV1, MPEG-DASH, etc.), one variation for each of the representations 314. For example, a first representation 314 (Representation 1) of a particular transcoded segment of a content item may have a first bitrate (for example, a maximum bitrate for that segment), a first content quality, a first data format, and/or via a first streaming protocol. A second representation 314 (Representation 2) of that same transcoded segment of the same content item may have a different second bitrate (for example, a maximum bitrate for that segment), a different second content quality, a different second data format, and/or a different second streaming protocol. Where a plurality of the representations 314 are generated for a given segment, each of the representations 314 may have at least one characteristic (e.g., bitrate of the transcoded segment) different from others of the representations 314 for that segment. In the example of Representation 1 and Representation 2 discussed above, one representation for a given segment may have a higher transcoded bitrate (for example, a higher maximum transcoded bitrate) than the other representation for that same segment.

Some of all of the transcoded segments, for a given one of the representations 314 for a given one of the content items 313, may be of constant length based on playback time of that segment, relative to other segments. For example, if the content item 313 is a one-hour video program, then for each of the representations 314 associated with that content item 314, the video program may be divided and then transcoded (or transcoded and then divided) into 1,800 two-second segments (totaling 3,600 seconds of video per representation). Moreover, two or more segments within a given representation 314 may be of different time lengths. For example, one of the segments may be two seconds in length and another of the segments may be one second in length. Also or alternatively, two or more segments for a given representation 314 may have constant or varying lengths based on quantities of data in the segments. For example, one of the segments may contain 1 MB (megabyte) of content data, and another of the segments may contain 1.5 MB of content data. Each segment may be of any fixed or variable time length, e.g., on the order of milliseconds, seconds, or minutes. In further examples, each segment may be about 2 seconds in length, or each segment may be about 1 second in length, or each segment may be less than 5 seconds in length. Segments may be of any data length, e.g., on the order of one or more KB (kilobytes), one or more MB, or one or more GB (gigabytes) of content data.

The transcoder 303 may output each of the representations 314 in the form of one or more packets 305 that may each comprise a descriptor 305a (such as a packet header) and a payload 305b. Each payload 305b may include at least some of the data representing the transcoded segment(s). The transcoder 303 may then store each of the packets 305 in a transcoded content library 315. The transcoded content library 315 may be physically different from or the same as the mezzanine content library 301 and/or a manifest storage 318, and may be in one or more different geographical locations or the same geographical location(s) as the mezzanine content library 301 and/or the manifest storage 318.

The transcoder 303 may also determine, for each transcoded segment of each of the representation 314, one or more characteristics of the transcoded segment. Examples of the characteristic(s) that may be determined include bitrate (for example, one or more maximum transcoded bitrates or other transcoded bitrates for the segment), content quality (for example, picture resolution), segment length (time length and/or data size), and/or complexity of the transcoded content item or portion thereof. The transcoder 303 may determine the characteristic(s) for a given transcoded segment based on indirectly or directly measuring the characteristics, calculating the characteristics, estimating the characteristics, or the like, based on the content item 313 associated with the transcoded segment and/or based on the transcoded segment itself. For example, during the transcoding process, following the allocation of bits to each picture in a given segment, the transcoder 303 may calculate the sum of all bits allocated per picture and include the resulting summated value into one or more descriptors 305a for the segment so that this information could be parsed further downstream, such as by the packager 306. Also, the transcoder 303 may determine segment length and/or resolution of a transcoded segment prior to or during transcoding, by interrogating a transcoder configuration (e.g., XML, JSON, etc.) that may be used to tell the transcoder 303 what the segment length, resolution, etc. are supposed to be. The one or more characteristics may be determined on a segment-by-segment basis for an entire transcoded content item 313 or for any one or more portions of the transcoded content item 313. For example, the transcoder 303 may determine, for each representation 314 for a given content item 313, the bitrate (for example, maximum bitrate) for each transcoded segment or for each group of n>1 transcoded segments. Each descriptor 305a may comprise one or more indications of the one or more characteristics determined by the transcoder 303. Thus, after the packet(s) 305 are received by the packager 306 for a given transcoded segment, the packager 306 may parse the associated descriptor(s) 305a and read the indication(s) of the one or more characteristics for that segment.

To initiate or continue delivery of content to the device 310, the device 310 may send the request 312, which may indicate or otherwise be associated with one or more requested segments associated with a desired content item 313. Based on the request 312, the content retriever 302 may retrieve the data packet(s) 305 containing the desired one or more segments, and possibly also containing one or more further segments, such as one or more segments later in the content item 313.

To determine the one or more characteristics associated with the transcoded content item 305, the transcoder 303 may transcode one or more segments and determine the one or more characteristics based on those transcoded segments. The transcoder 303 may additionally or alternatively determine one or more of the characteristics for one or more segments prior to transcoding (or prior to fully transcoding) the one or more segments. For example, the transcoder 303 may determine the one or more characteristics based on a pre-transcoded version of the segment, and/or based on metadata stored at, for example, the content library 301. In the example discussed above, the transcoder 303 may determine the transcoded bitrates for each representation 314 of a given segment after actually transcoding the segment into each of the representations 314, or prior to any transcoding of the segment, or after transcoding the segment into a subset of (for example, only a single one of) the representations 314, and deriving the characteristics for other representations for the segment based on the characteristics of the subset (e.g., one) of the representations.

As discussed above, the representations 314 may be stored in the transcoded content library 315, such as in the form of the one or more packets 305 for each transcoded segment. One or more of those packets 305 may be subsequently retrieved for delivery to a device such as to the device 310. The device 310 may be any device, such as any computing device, for example any of the devices 110-117 and 125 in FIG. 1. To initiate delivery of a content item (or to continue delivery of further segments of a content item that has already begun delivery) to the device 310, the device 310 (or another device associated with the device 310) may send a request 312 associated with (e.g., identifying) the content item, one or more transcoded segments of the content item, and/or one or more packets 305 associated with the content item. The request 312 may be received by, for example, the content retriever 302, or by any other device. In response to or otherwise after the request 312, the content retriever 302 may retrieve, from the transcoded content library 315, the packets 305 for selected transcoded segments, and pass those data packets 305 to the packager 306. The packager 306 may be responsible for parsing and reading the descriptors 305a of the passed packets 305, and for packaging and delivering (such as via one or more transport streams such as MPEG transport streams) the content in the payloads 305b to the device 310 in the form of fragments 320 each containing one or more of the segments 314.

The packager 306 may also receive or otherwise determine information 319, which may include, for example, data indicating the current and/or expected state of the network (e.g., network congestion, available network bandwidth, a fragment length preference, time of day, day of the week, and/or data provided by device 310 such as the type or speed of network connection being used by device 310 to receive fragments 320). The information 319 may be determined based on one or more real-time or delayed measurements (for example, a measurement relating to video quality, such as a measurement of or relating to network congestion, of or relating to available network bandwidth, and/or of or relating to actual received video by the device 310 or by an intervening device between the packager 306 and the device 310), where the measurement(s) may be performed anywhere in the network, such as at the packager 306 side (e.g., measurement M1) or at the device 310 side (e.g., measurement M2). Where one or more of the measurements are at the device 310 side, the device 310 may perform the measurements (e.g., perform measurement M2) and directly or indirectly report the information 319 to the packager 306. The packager 306 may use the information 319 to determine how to package one or more of the segments 314 into fragments 320. For example, the packager 306 may determine the length of each fragment 320 (how many segments are contained in a fragment) based on the information 319. For example, if the information 319 indicates a higher level of network congestion and/or less available network bandwidth (which may be a result of measurement, as discussed above), packager 306 (and/or another element in the network, such as the content retriever 302) may determine that each fragment 320 should contain fewer segments 315. Likewise, if the information 319 indicates a lower level of network congestion and/or more available network bandwidth, packager 306 (or another element in the network) may determine that each fragment 320 should contain a relatively larger number of segments 315.

The packager 306 (or another device) may also be responsible for updating a manifest 308 based on the descriptors 305a of the packets 305 retrieved from the transcoded content library 315. For example, based on each descriptor 305a, the packager 306 may generate data indicating one or more of the characteristics identified by the descriptor 305. The data, referred to herein by way of example as a manifest 308, may be created and delivered to a device (e.g., the device 310) without being stored, or may be stored in the manifest storage 318. The manifest 308 may be made available to a device (e.g., the device 310), and may be any type and format of data (e.g., any data set in any desired format), such as one or more data files, tables, lists, collections, etc. The manifest storage 318 may be physically different from or the same as the mezzanine content library 301 and/or the transcoded content library 315, and may be in one or more different geographical locations or the same geographical location(s) as the mezzanine content library 301 and/or the transcoded content library 315. While the fragments 320 are being delivered, the manifest 308 may be stored and/or provided separately from the fragments 320, or the manifest 308 may be packaged with the fragments 320. For example, one or more of the transport streams may comprise the manifest 308. Or, the manifest 308 may be stored in a location for retrieval by the device 310. The manifest 308 may be updated 309 by the packager 306, and may be read 311 by the device 310. For the device 310 to obtain the manifest 308, the manifest 308 may be pushed to the device 310 or it may be retrieved (for example, requested, or pulled) by the device 310. If the manifest 308 is pushed to the device 310, the manifest 308 may be updated (e.g., modified in place or entirely replaced), and pushed on a periodic basis or on an as-needed basis. For example, the updated manifest 308 may be pushed every segment, or every nth segment (n>1). Or, the updated/replaced manifest 308 may be pushed on a regular or irregular time period basis, such as every half second, every second, every nth second (n>1), or at variable time periods.

The manifest 308 may have a particular published or otherwise known location in the manifest storage 318, which may be identified by a location identifier, such as a universal resource locator (URL), that the device 310 can access to retrieve the manifest 308. If the manifest 308 is retrieved from the manifest storage 318 by the device 310, the manifest 308 may be electronically published, and the published manifest 308 may be updated (for example, modified, or entirely replaced and re-published) in the manifest storage 18 periodically or as needed, such as prior to each time the manifest 308 is published, sent, or otherwise made available for access by the device 310. For example, the manifest 308 may be updated or replaced for every segment, or for every nth segment. Or, the manifest 308 may be updated or replaced on a regular or irregular time period basis, such as every half second, every second, every nth second (n>1), or at variable time periods.

Figure 6:
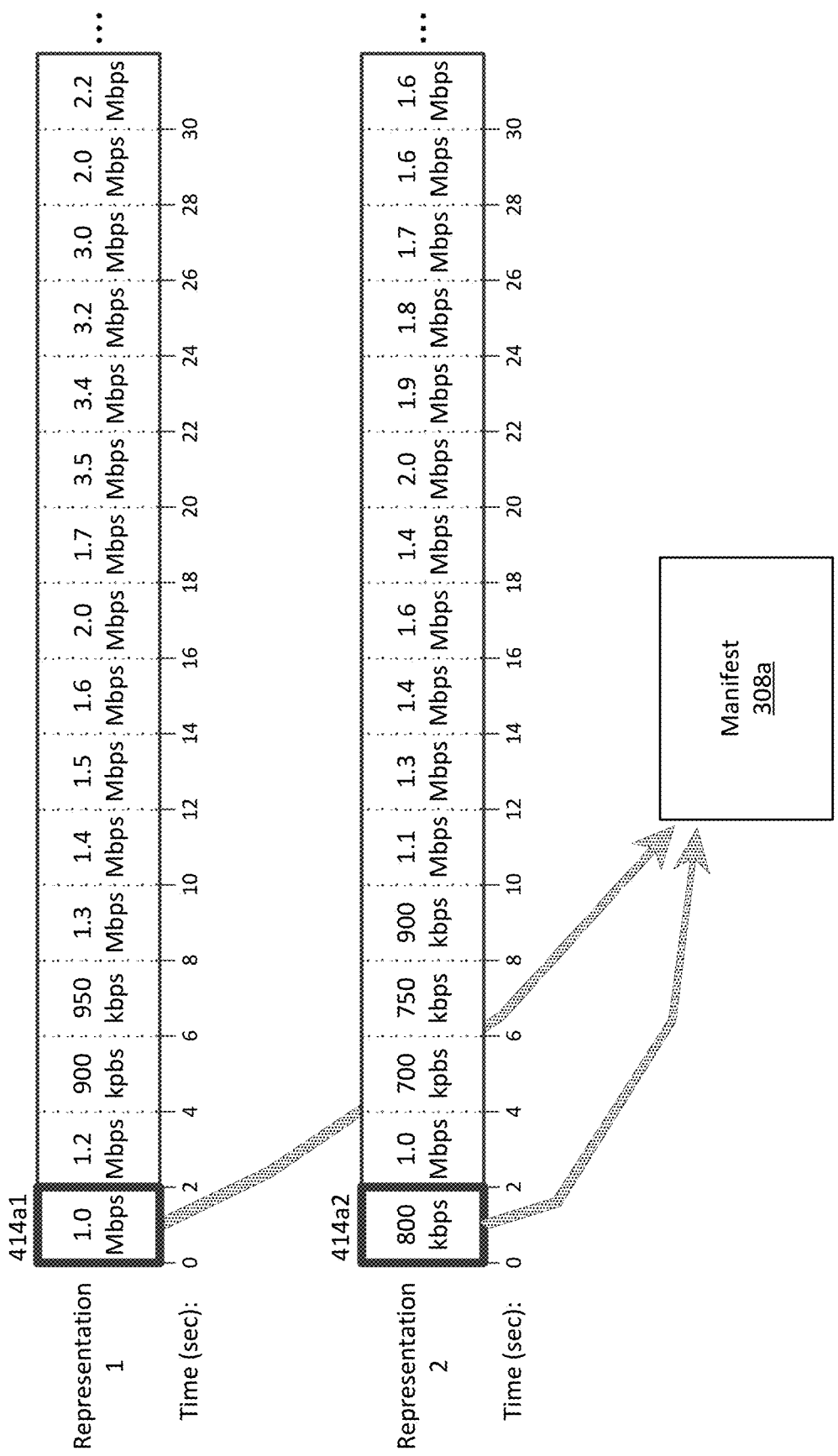
FIGS. 6-8 show examples of content and associated manifests.
Figure 7:
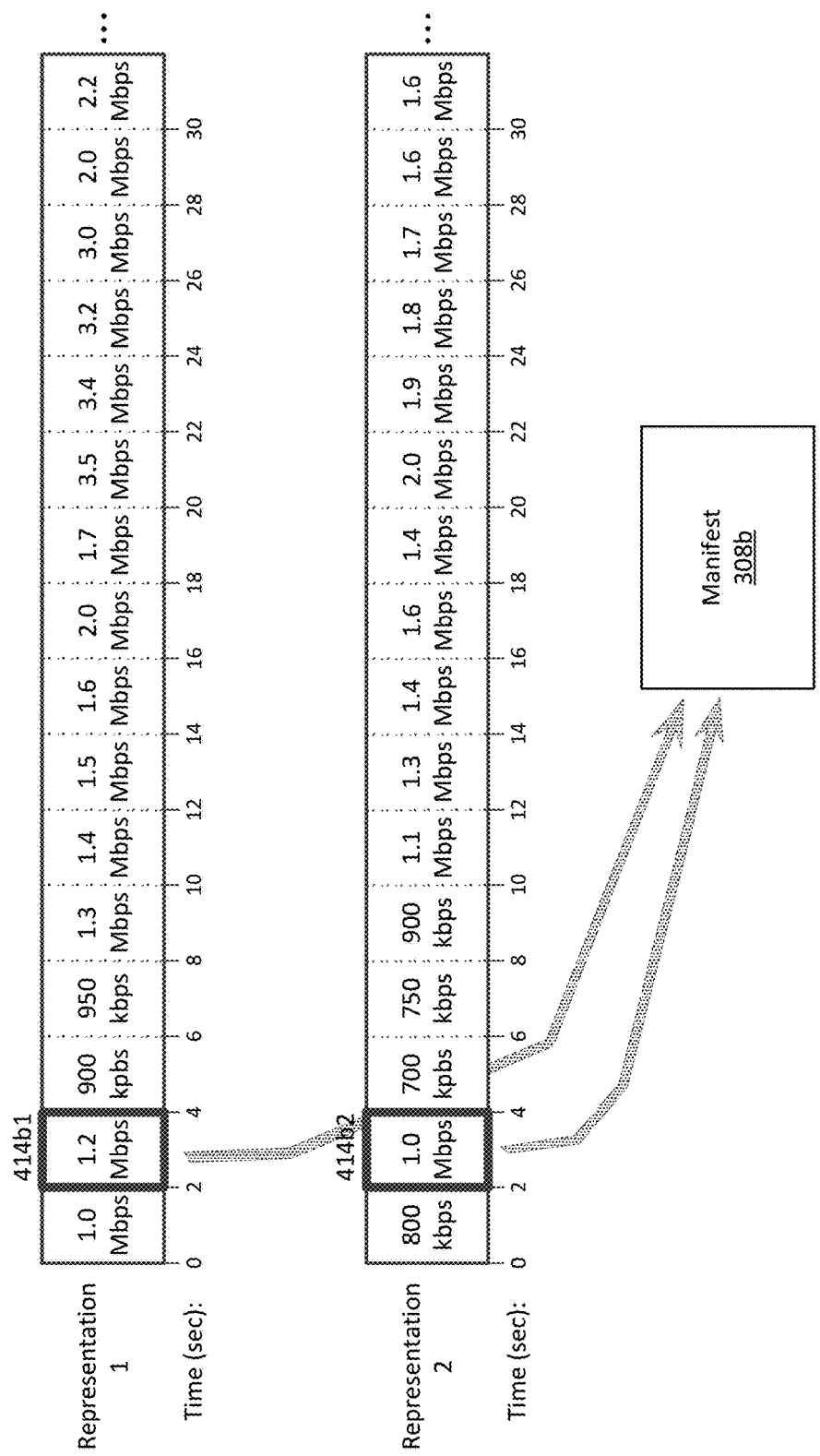
Figure 8:
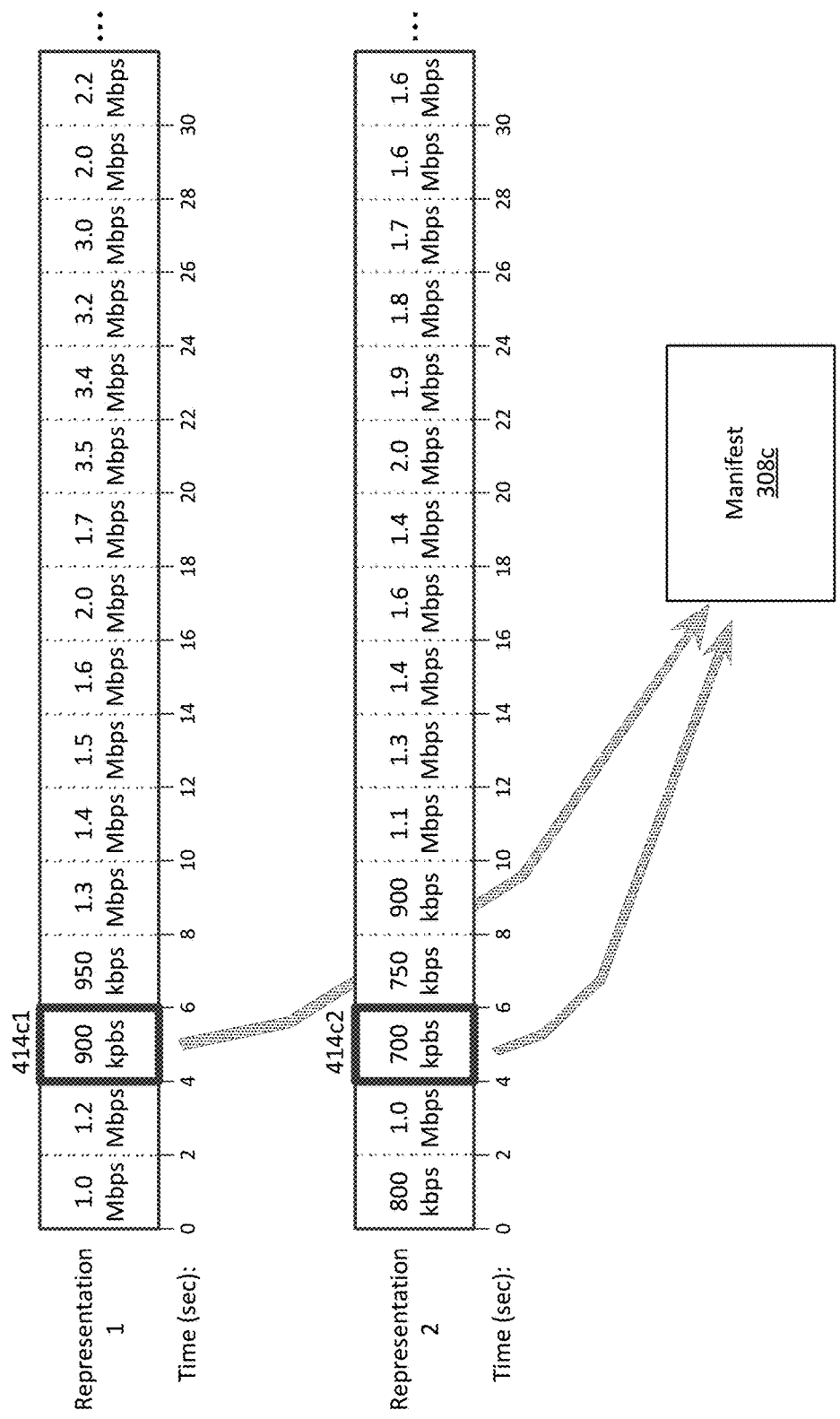

The manifest 308 may comprise or indicate (e.g., may comprise an index of) information associated with each of a plurality of representations of a content item. The information may indicate, or otherwise be based on, the one or more characteristics discussed above. For example, the manifest 308 may comprise bandwidth information and/or other information for a first representation (e.g., Representation 1) of a given segment and/or fragment containing the segment (for example, an indication of maximum bitrate, complexity, etc. of the Representation 1 fragment containing the segment), and bandwidth information and/or other information for a second representation (e.g., Representation 2) of that given segment and/or fragment containing the segment (for example, an indication of maximum bandwidth, complexity, etc. of Representation 2 of the segment and/or fragment). Various examples of information that may be in the manifest 308 are shown in FIGS. 6-8. To obtain the bandwidth information for a given segment and/or fragment, the packager 306 may translate the bitrate information for the segment and/or fragment (indicated by, for example, the descriptor 305a), into bandwidth information that is to be included in the manifest 308.

Figure 4A:
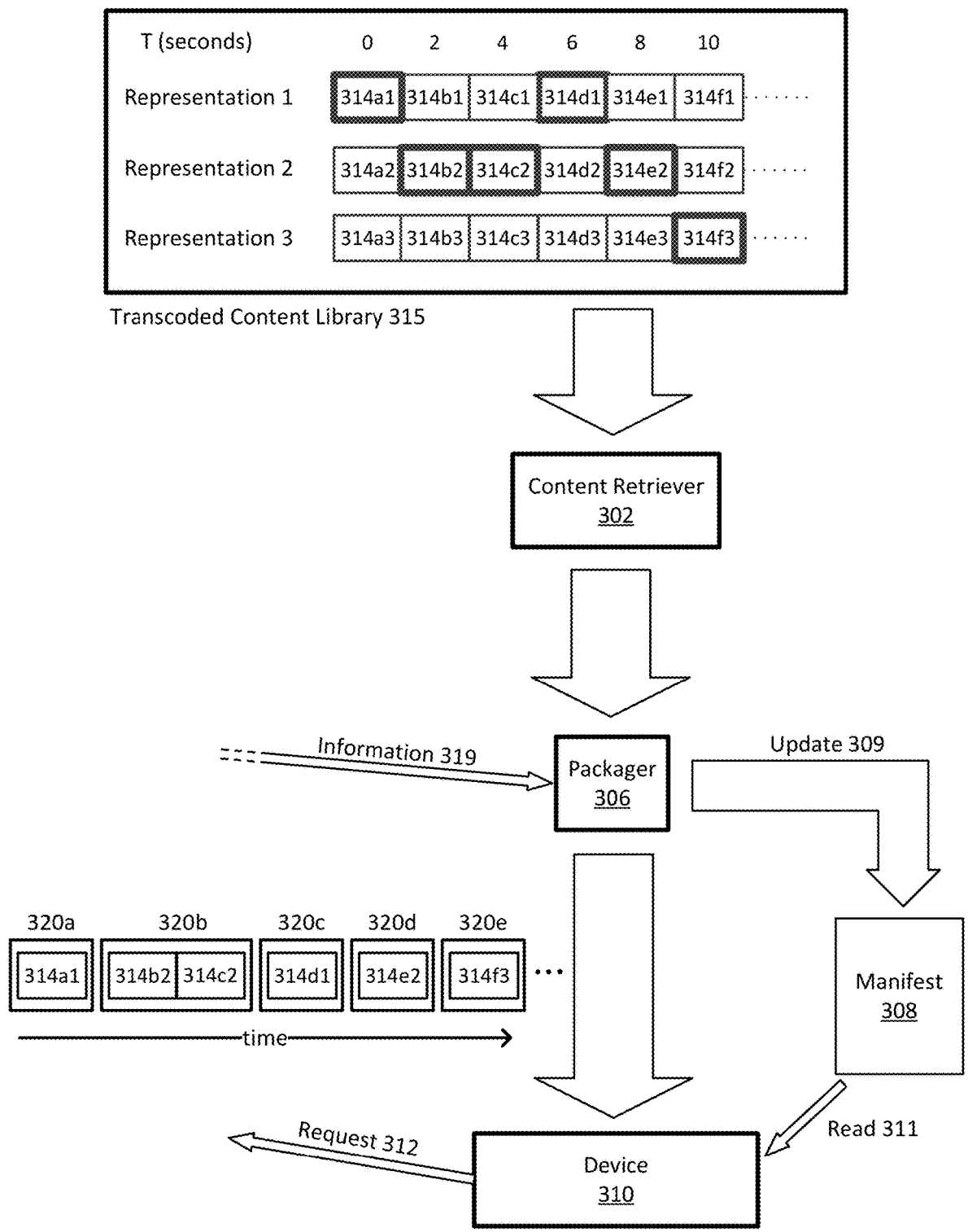
FIGS. 4A-4B show examples of content and representations.

FIG. 4A shows an example of how selected transcoded segments of representations 314 may be provided as one or more fragments 320 to the device 310, such as by the process and system described in connection with FIG. 3. In FIG. 4A, a content item 313 may have been transcoded and divided into a plurality of segments 314 for each of three representations (Representation 1, Representation 2, and Representation 3). The number of representations created and/or available for a given content item may be determined based on, for example, the capabilities of the transcoder 303, the capabilities of the device 310 (which may be communicated to the content provider such as via the request 312), the throughput (for example, measured throughput) of the communication link(s) 101, one or more characteristics of the content item to be transcoded (such as the quality, length, and/or bitrate of the content item to be transcoded), the expected characteristics of the content item after transcoding (such as the quality and/or bitrate of the content item after transcoding), an indication of the number of representations or a range of desired characteristics (e.g., qualities and/or transcoded bitrates of the representations) (which may be communicated to the content provider such as via the request 312), and/or any other factors.

In FIG. 4A, for each of the segments 314, Representation 1 may have a first bitrate (and/or quality) for the transcoded segment, Representation 2 may have a second bitrate (and/or quality) for the transcoded same segment lower than the first bitrate, and Representation 3 may have a third bitrate (and/or quality) for the transcoded same segment lower than the second bitrate. For example, each of the transcoded segments 314a1, 314a2, and 314a3, while representing the same segment, may have different characteristics such as different transcoded bitrates and/or different qualities. For example, the transcoded segment 314a1 may have a first transcoded bitrate and/or a first transcoded quality, the transcoded segment 314a2 may have a second transcoded bitrate and/or a second transcoded quality lower than the first transcoded bitrate and/or the first transcoded quality, and the transcoded segment 314a3 may have a third transcoded bitrate and/or a third transcoded quality lower than the second transcoded bitrate and/or the second transcoded quality. These differences in characteristics between representations of the same segment may be found amongst any of the triplets of segment representations, such as amongst segments 314b1, 314b2, and 314b3, amongst 314c1, 314c2, and 314c3, etc. For example, the transcoded segment 314b1 may have a fourth bitrate and/or a fourth quality, the transcoded segment 314b2 may have a fifth bitrate and/or a fifth quality lower than the fourth bitrate and/or the fourth quality, and the transcoded segment 314b3 may have a sixth bitrate and/or a sixth quality lower than the fifth bitrate and/or the fifth quality.

In the example of FIG. 4A, the segments 314 are each two seconds in length, and the device 310 may, based on the manifest 308, select Representation 1 to be used for the segments at time T=0 and 6, select Representation 2 to be used for the segments at time T=2, 4, and 8, and select Representation 3 to be used for the segment at time T=10. Each of these selected transcoded segments is indicated in FIG. 4A with a thick border. The device 310 may send an indication of which representations and/or segments are to be used via one or more of the requests 312. Based on the requests 312, the content retriever 302 may retrieve the appropriate transcoded segments from the transcoded content library 315, and pass these transcoded segments (such as in the form of packets 305) to the packager 306. The transcoded segments retrieved in this example are transcoded segments 314a1, 314b2, 314c2, 314d1, 314e2, and 314f3. The packager 306 may use information from the selected transcoded segments 314 (such as from the descriptors 305a of the packets 305) and/or from the information 319 to update the manifest 308 and/or to package the selected transcoded segments 314, and may package the selected transcoded segment(s) 314 into one of the fragments 320 as discussed previously, which would then be delivered to the device 310. In the example shown in FIG. 4A, a fragment 320a may include segment 314a1, a fragment 320b may include segments 314b2 and 314c2, a fragment 320c may include fragment 314d1, a segment 320d may include fragment 314e2, and a fragment 320e may include segment 314f3. Each fragment 320 may have a length in time equal to the sum of the length of the fragments it contains. For example, where each segment is two seconds in length, a fragment 320 containing one segment may also be two seconds in length, a fragment 320 containing two segments may be four seconds in length, a fragment 320 containing three segments may be six seconds in length, and so on.

Figure 4B:
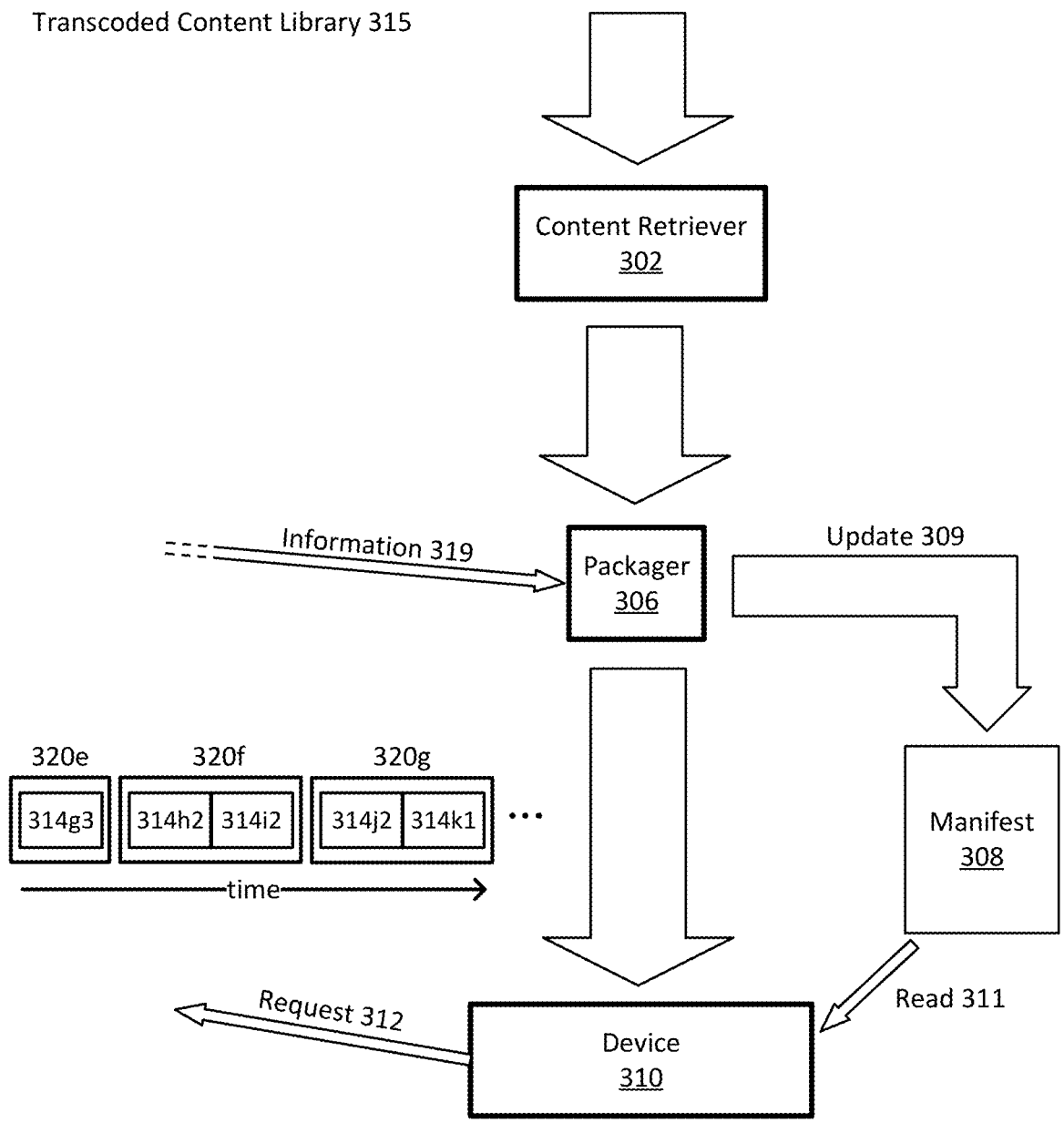

FIG. 4B shows another example of selected transcoded segments 314 being provided as one or more fragments 320 to the device 310, such as by the process and system described in connection with FIG. 3. In this example, Representations 1-3 may be the same Representations 1-3 for the same content item as in FIG. 4A, except occurring later in the content item (here, time starts at T=12 seconds whereas FIG. 4A explicitly shows segments up through T=10 seconds). In this example, segment 314g3 is selected and sent to the device 310 in fragment 320e, segments 314h2 and 314i2 are selected and sent to the device 310 as part of fragment 320f, and segments 314j2 and 314k1 are selected and sent to the device 310 as part of fragment 320g. In both the examples of FIGS. 4A and 4B, the length of each fragment 320 may depend on a determination, such by the packager 306, and that determination may be based on information such as the requests 312 and/or the information 319. Moreover, the length of each fragment 320 may sometimes or always be static over time (e.g., always one segment, or always two segments), and/or may sometimes or always be dynamically changing based on the requests 312 and/or the information 319, which may also be dynamically changing over time. For example, as the values measured by measurements M1 and/or M2 change over time, the information 319 may change in response, and the packager 306 may likewise use this changed information 319 to determine a different length for the next fragment.

In the examples of FIGS. 4A and 4B, all of the segments 314 for all of the representations may have been previously created via transcoding by the transcoder 303, even though only a subset of those segments may be actually sent to the device 310 as part of fragments 320. The segments that are actually sent to the device 310 may depend on, for example, which segments and/or representations are requested by the device 310 via one or more of the requests 312. The system may alternatively operate in an on-demand manner, such that the transcoder 303 may provide just-in-time transcoding (based on the requests 312) to generate only those segments for those representations needed for delivery to the device 310.

Figure 5:
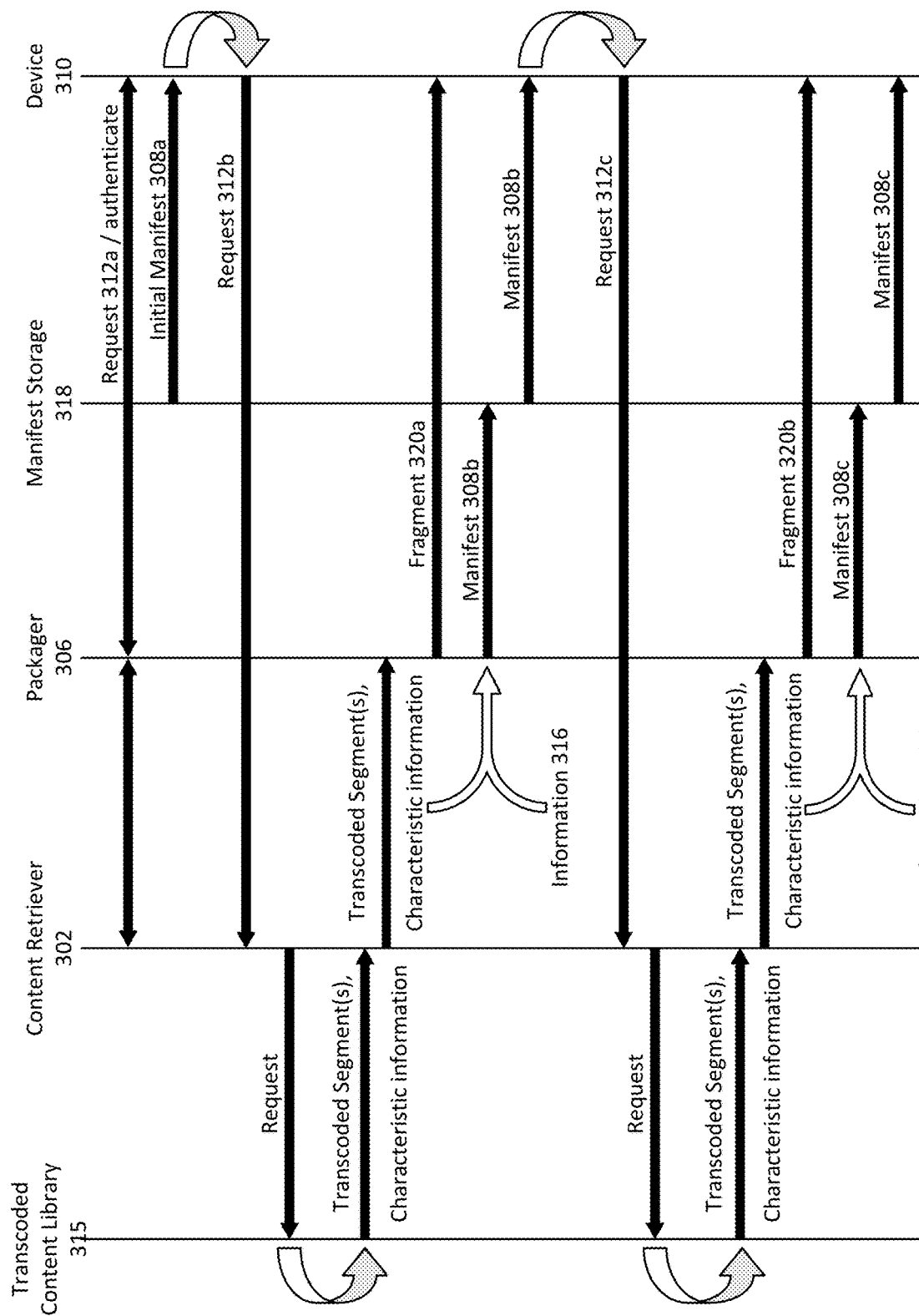
FIG. 5 shows an example communication flow.

FIG. 5 is a flow diagram showing example communications related to systems and methods of FIG. 3. The communication flow of FIG. 5 may be used to implement the examples of FIGS. 4A and 4B. After the appropriate content items 313 have been segmented and transcoded by transcoder 303 and stored in the transcoded content library 315, the device 310 may send a request 312a (for example, one of the requests 312 of FIG. 3), which may be a first request from the device 310 for a communications session, which may identify a certain content item (and/or one or more segments thereof) desired to be received by the device 310, and/or which may be used to authenticate the device 310. The request 312a may further provide information about the device 310, such as an indication of capabilities of the device 310 (e.g., maximum resolution, maximum bandwidth, user preferences, and/or the like). The request 312a may be received by, for example, the packager 306 and/or the content retriever 302. In response to the request 312a, the packager 306 may provide an initial manifest 308a (for example, one of the manifests 308 of FIG. 3) to the device 310 (e.g., by sending the manifest 308a directly to the device 310 or by publishing the manifest 308a for retrieval by the device 310). The indication of the initial manifest 308a may comprise, for example, an indication of a location (for example, a URL) in the manifest storage 318 from which the initial manifest 308a may be retrieved. Additionally or alternatively, the initial manifest 308a itself may be sent to the device 310 from the manifest storage 318. In response to the indication of the initial manifest 308a, the device 310 may retrieve the initial manifest 308a from the indicated location. As explained previously, one or more of the manifests 308 may be updated (for example, modified or entirely replaced) over time in any of a number of ways. The initial manifest 308a, for any given content item (e.g., a video-ondemand (VOD) asset or Linear stream), may exist in a Common Interchange Format (CIF), such as MPEG-DASH, before the device 310 begins selection or playback of the content item. As will be described below, during a playback session for the content item, the information in packet descriptors 305a (FIG. 3) may be interrogated (e.g., periodically) by packager 306 to update the manifest 308 as the device 310 continues to request additional segments of the video/audio over time. Therefore, updated manifests (e.g., manifest 308b, manifest 308c, etc.) may be made available over time to the device 310 so that the device 310 can be better informed as to what the actual bandwidth requirement to stream any representation in the relevant manifest 308 might be.

The initial manifest 308a may indicate one or more representations of the requested content item. As explained previously, each of the representations may have one or more different characteristics for a given one or more segments, such as different segment transcoded bitrates, different transcoded segment qualities of the represented content, and/or different transcoded segment lengths. Continuing the example in the previous paragraph, the initial manifest 308a may indicate a plurality of different representations for the first segment in the content item identified by the request 312a, and/or for one or more additional segments such as for one or more immediately subsequent segments in the content item.

An example of at least a portion of the initial manifest 308a is shown below, in which the initial manifest 308a comprises information, for each of Representation 1 and Representation 2, for the first transcoded segment and/or fragment of a content item:

```
<Period id="1" start="PT0H0M0.000S">
    <AdaptationSet id="2" contentType="video" mimeType="video/mp4">
        <SegmentTemplate initialization="manifest/init.mp4"
media="manifest/init.mp4" timescale="90000" startNumber="1"
presentationTimeOffset="2790000">
            <SegmentTimeline>
                <S t="2790000" d="180180" r="0"/>
            </SegmentTimeline>
        </SegmentTemplate>
        <!-- QOE signals to the player additional, xcoder measurement
of video quality to help it judge tradeoffs between quality and bit rate --
>
        <Representation id="video00" bandwidth="800000" QOE="53"
codecs="avc1.4d401f" width="320" height="180"/>
        <Representation id="video01" bandwidth="1000000" QOE="82"
codecs="avc1.4d401f" width="640" height="360"/>
    </AdaptationSet>
</Period>
```

In this example, the content item has a plurality of transcoded segments that are each two seconds in length (for example, segments that begin at intervals of every two seconds). However, the content item may have transcoded segments of any fixed or variable length. To simplify the drawing, Representation 3 is not explicitly shown in FIG. 6 (or in FIGS. 7 and 8), however it will be understood that Representation 3 (and additional other representations) may also be indicated in any of the manifests 308a-c. Thus, initial manifest 308a may comprise, for example, information for each of Representation 1, Representation 2, Representation 3, and/or any other representations of the content item as desired. The initial manifest 308a in this example indicates that, for Representation 1, the fragment length is one segment, and the associated transcoded segment for that fragment (the transcoded segment 314a1) would have a maximum bandwidth of 1 megabit per second (Mbps). The manifest 308a further indicates that, for Representation 2, the fragment length is also one segment, and the associated transcoded segment for that fragment (the transcoded segment 314a2) would have a maximum bandwidth of 800 kilobits per second (Kbps). The maximum bandwidths here may be based on the determined characteristic(s) discussed previously. In other variations, the initial manifest 308a may additionally or alternatively indicate other information for a transcoded segment, such as another type of bandwidth (for example, average bandwidth for the transcoded segment and/or fragment containing the segment), content quality (for example, content resolution, bits-per-pixel for the transcoded segment and/or fragment, and/or value from a video quality measurement such as structural similarity (SSIM) for the transcoded segment and/or fragment), a segment length, a fragment length, and/or another characteristic for each of the transcoded segments 314a1, 314a2 and/or fragment(s) containing those segments. The manifest 308a may further comprise the same indications for one or more further transcoded segments and/or fragments thereof, such as for the transcoded segment 314a2.

The device 310 may select, based on the manifest 308a, based on a measured network performance, and/or based on any other factors, which of the representations (and/or segment(s) thereof) are desired. According to the flow of FIG. 5, the device 310 may then send a request 312b indicating the selected representation. Because the device 310 has already been authenticated (using, for example, the request 312a), the request may be sent to the content retriever 302 rather than the packager 306. However, the request 312b may be sent to, and/or received by, any one or more of the blocks of FIG. 3. The request 312b may indicate one of the representations (and/or segments thereof). For example, assume that the device 310 determines (e.g., measures) that it has up to 2 Mbps of bandwidth available at the moment. In that case, the device 310 may compare the available bandwidth (2 Mbps) with the information in the manifest 308a for one or more of the representations, and determine based on the comparison that the available bandwidth is higher than the maximum bandwidth (1 Mbps) of the relevant segment (the transcoded segment 314a1) for Representation 1. Thus, the device 310 may generate the request 312b to indicate Representation 1, corresponding to the transcoded segment 314a1, which corresponds to the original content segment 314a. Put another way, the device 310 may select and request the representation indicated by the manifest 308a as having the segment with the highest maximum bandwidth that does not exceed the bandwidth available to the device 310. While this example uses a characteristic of maximum bandwidth for each transcoded segment, the same process may be performed for other types of characteristics. For example, if the manifest 308a had indicated the quality of the transcoded segment for each representation, the device 310 may compare the indicated quality for each representation with the available bandwidth.

If, instead, a manifest was used that was not updated regularly such as on a segment-by-segment basis (for example, a static manifest for the entire content representing the highest bandwidth across all segments of Representation 1), the manifest might have indicated that the maximum bandwidth of Representation 1 is 3.4 Mbps and the maximum bandwidth of Representation 2 is 2.0 Mbps (which are respectively the maximum bandwidth of any segment shown in these representations). In such a case, the indicated maximum bandwidth of Representation 1 would have been higher than the available bandwidth of 2 Mbps. Thus, if the manifest were not updated such as in the manner described herein, the device 310 might have chosen Representation 2 for any of the segments, a lower quality representation than Representation 1. This may have resulted in a less desirable selection for at least some segments of the content as compared with using a manifest that is dynamically updated, with the manifest 308b such that both manifests 308a and 308b simultaneously exist. Moreover, the manifest 308b may be published to the same location as, or to a location different from, the location at which the manifest 308a was previously published. An example of at least a portion of the manifest 308b is as follows:

```
<Period id="2" start="PT0H0M2.000S">
    <AdaptationSet id="2" contentType="video" mimeType="video/mp4">
        <Role schemeIdUri="urn:mpeg:dash:role:2011" value="main"/>
        <SegmentTemplate initialization="manifest/init.mp4"
media="manifest/init.mp4" timescale="90000" startNumber="2"
presentationTimeOffset="2790000">
            <SegmentTimeline>
                <S t="2790000" d="180180" r="0"/> <!-- This timestamp is just for
demo purposes, also the presentationTimeOffset above -->
                <S t="459185940" d="37536" r="0"/>
            </SegmentTimeline>
        </SegmentTemplate>
        <Representation id="video00" bandwidth="1000000" QOE="55"
codecs="avc1.4d401f" width="320" height="180"/>
        <Representation id="video01" bandwidth="1200000" QOE="84"
codecs="avc1.4d401f" width="640" height="360"/>
    </AdaptationSet>
</Period>
``` for example, on a segment-by-segment basis. For example, the examples of the dynamic manifest 308 described herein may allow the device 310 to make better choices, as exemplified by the device 310 selecting the higher-quality Representation 1 for the first segment of the example content.

Based on the request 312b, the content retriever 302 may request (for example, retrieve) one or more transcoded segments (in this example, at least segment 314a1, which would have a maximum bandwidth of 1 Mbps). The content retriever 302 (or another element such as the packager 306) may determine a quantity of the segments to retrieve in response to the request 312b. The number of segments retrieved may depend on one or more factors, for example the information 319 and/or an explicit number of segments indicated by the request 312b. In this example, it is determined that only one segment (segment 314a1) is to be retrieved in response to the request 312b. The retrieved transcoded segment 314a1 may be forwarded by the content retriever 302 to the packager 306. The retrieved transcoded segment 314a1 may be in one or more packets 305, which as explained above may include one or more descriptors 305a indicating one or more characteristics of one or more subsequent transcoded segments, as this information may be used to generate the updated next version of the manifest 308b.

The packager 306 may package the retrieved transcoded segment 314a1 into fragment 320a, and send fragment 320a to the device 310. The packager 306 may further generate the next updated manifest 308b, based on the characteristic(s) indicated by the descriptor(s) 305a in the packet(s) 305 and/or the information 319. The packager 306 may also send manifest 308b to the device 310 and/or publish the manifest 308b to the manifest storage 318 for retrieval by the device 310. The packager 306 may further send directly to the device 310 and/or publish a link (for example, a URL) to the location of the published and updated manifest 308b. The packager 306 may update the manifest 308 from the manifest 308a to the manifest 308b in any of a number of ways. For example, the packager 306 may wholly replace the manifest 308a with the manifest 308b, modify without deleting the manifest 308a to result in the manifest 308b, and/or supplement the manifest 308a In this example, the manifest 308b indicates that the Representation 1 transcoded version of the segment 314b (the transcoded segment 314b1) has a fragment length of one segment and has a maximum segment bandwidth of 1.2 Mbps, and that Representation 2 has a fragment length of two segments, and that the transcoded versions of the segments 314b and 314c (the transcoded segments 314b2 and 314c2) have a maximum bandwidth bitrate of 1.0 Mbps and 700 Kbps, respectively.

The communication flow of FIG. 5 may continue as described above, but with the client using the manifest 308b to determine which representation to select. The client sends the request 312c based on and/or indicating this selection, and further appropriate segments are retrieved, analyzed, and/or transcoded, and then packaged and sent to the device 310. For example, the device 310 may select, based on the manifest 308b, current measured network conditions, and/or capabilities of the device 310 (e.g., the device 310 buffer status and maximum bandwidth capabilities), Representation 2. In particular, the device 310 may determine that it would like to receive a transcoded version of segment 314b in accordance with Representation 2device 310. This would correspond to segment 314b2, consistent with the example of FIG. 4A, in which the fragments 320 contain the transcoded segment 314a1 followed by the transcoded segment 314b2. For example, assume that the device 310 determines (e.g., measures, such as via measurement M2 or elsewhere) that it has up to 1.1 Mbps of bandwidth available at the moment. In that case, the device 310 may compare the available bandwidth (1.1 Mbps) with the information in the manifest 308b for one or more of the representations, and determine based on the comparison that the available bandwidth is higher than the maximum bandwidth (1 Mbps) of the relevant segment (the transcoded segment 314b2) for Representation 2 and lower than the maximum bandwidth (1.2 Mbps) of the transcoded segment 314b1 for Representation 1. Thus, the device 310 may generate the request 312b to indicate Representation 2, corresponding to the transcoded segment 314b2, which corresponds to the original content item segment 314b. Put another way, the device 310 may again select and request the representation indicated by the manifest 308b as having the segment with the highest maximum bandwidth that does not exceed the bandwidth available to the device 310. In addition to segment 314b2, the content retriever 302 may determine, based on, for example, the information 319 and/or the request 312c, that it should retrieve two segments, and so the content retriever 302 also retrieves segment 314c2. The packager 306 may take both segments 314b2 and 314c2, and package them into a single fragment 320b for sending to the device 310.

Thus, the device 310 may repeatedly ask for the manifest 308 for each segment and/or fragment of the content item, and the packager 306 (and/or other element) may repeatedly update the manifest 308 over time (such as for each segment and/or for each fragment). Moreover, the manifest 308 may dynamically update the segment and/or fragment bandwidths, and/or dynamically update associated fragment lengths for each representation. An example of information that may be updated in the manifest 308 over time is shown in the table of FIG. 9. The table also shows examples selections by the device 310, indicated by thick borders, of representations based on the available bandwidth and/or other factors. For example, at segment start time 0 seconds, the device 310 may determine that its available bandwidth is 2 Mbps, and the current iteration of the manifest 308 may indicate that for this segment as transcoded, the maximum bandwidth for Representation 1 would be 1.0 Mbps, the maximum bandwidth for Representation 2 would be 800 Kbps, and the maximum bandwidth for Representation 3 would be 700 Kbps. The device 310 may compare its determined available bandwidth with one or more of the maximum bandwidths indicated by the current version of the manifest 308, and determine that it should select Representation 1 for this particular segment, because Representation 1 has the highest maximum bandwidth that does not exceed the available bandwidth.

All of the selections by the device 310 need not be based on the highest maximum bandwidth not exceeding the available bandwidth. The device 310 may take other factors into consideration when making such a selection. For example, the device 310 may use its current or predicted receive buffer status as at least one factor in making a selection of a particular representation, and may take into account the fragment lengths advertised by the manifest 308. For example, for the segment starting at 24 seconds, the available network bandwidth to the device 310 is 3.3 Mbps. Even though this is sufficient to receive Representation 1 of only 3.2 Mbps, the device 310 may determine that there is some reason (such as based on a determination that the client 310 has a nearly full receive buffer or based on a preferred fragment length shorter or longer than the fragment length indicated by the manifest 308) that it should select a different representation that may have a lower bandwidth. In this example, the device 310 selects Representation 2 having a bandwidth of 1.8 Mbps and a fragment length of 1, rather than Representation 1 having a bandwidth of 3.2 Mbps and a fragment length of 3. The device 310 may make this determination in order to prevent a threshold buffer fullness from being realized, or to reserve excess current or future bandwidth for other reasons such as in anticipation of another overlapping use of the bandwidth (such as for receiving associated or even unrelated data). Thus, because each of the representations, at any given time, may have different fragment lengths advertised by the manifest 308, the device 310 may also determine which representation to select based on the advertised fragment lengths.

The device 310 may purposely choose a representation having a lower bandwidth (and/or shorter fragment length) than it can actually handle (as it did for the segment starting at 24 seconds), so that, for example, the device 310 will have extra bandwidth to pre-fetch one or more subsequent (future) segments (and/or a portion of a subsequent segment) of the same content item. To allow the device 310 to have sufficient information to make an informed decision to perform such pre-fetching, the manifest 308 may indicate the maximum bandwidths and/or other characteristics for not only the upcoming segment, but also for one or more subsequent segments after the upcoming segment. For example, for the segment starting at 24 seconds, the manifest 308 may indicate, in addition to the maximum bandwidths for representations of that segment, maximum bandwidths for representations of the segments starting at 26 seconds, 28 seconds, and 30 seconds. Thus, the device 310 may use the manifest 308 to obtain a preview of what bandwidths may be needed, and to determine whether to request not only one of the representations of the segment starting at 26 seconds, but also to request one of the representations of any of those subsequent segments. Thus, the request 312 may additionally identify such subsequent segment(s) and/or representation(s) for those subsequent segment(s). Pre-fetching of subsequent segments may occur in an overlapping manner (for example, at least partially simultaneously) with loading of the upcoming segment. For example, the device 310 may request (via one or more requests 312) Representation 2 for the segment starting at 24 seconds and also Representation 1 for the segment starting at 26 seconds. In response, the content retriever 302 may retrieve both requested segments from the transcoded content library 315. In addition, the packager 306 may package and send both of the transcoded versions of the two segments to the device 310. In sending both transcoded segments, the packager 306 may send both one after the other, in a partially overlapping manner in time, and/or in a fully overlapping manner in time. When both segments are sent in a partially or fully overlapping manner, the two segments may be packaged together in the same one or more packets and/or in separate packets, and may be sent at least partially simultaneously with each other to the device 310.

Referencing again the example flow of FIG. 5, any of the requests 312a, 312b, and/or 312c may therefore request only a single representation for a single segment, or may request more than one representation for more than one segment. After receiving the manifest 308b, the device 310 may generate, based on the manifest 308b, the request 312c indicating (in this example) the selection of Representation 2 for the second segment of the content item, and the request 312c may be received by the content retriever 302. Based on the request 312c, the content retriever 302 may retrieve an appropriate one or more transcoded segments in the same manner described earlier with respect to this figure.

The packager 306 may then send the appropriate retrieved transcoded segment(s) to the device 310 and/or update the manifest 308, to generate and publish the manifest 308c in the same manner as discussed above for the manifest 308b. The manifest 308c may be based on the one or more characteristics of the transcoded segments as indicated by the one or more associate descriptors 305a. Manifest 308c, in this example, would indicate that the Representation 1 transcoded segment 314c1 has a maximum segment bandwidth of 900 Kbps, and that the Representation 2 transcoded segment 314c2 has a maximum segment bandwidth of 700 Kbps. The device 310 may determine (e.g., measure) that it only has up to 800 Kbps of bandwidth available (the network experience for the device 310 may have been degrading over the last several seconds). The device 310 may compare the available bandwidth (800 Kbps) with the information in the manifest 308c for one or more of the representations, and determine based on the comparison that the available bandwidth is higher than the maximum bandwidth (700 Kbps) of the relevant segment (the transcoded segment 314c2) for Representation 2. The device 310 may generate the request 312c to indicate Representation 2, corresponding to the transcoded segment 314c2. Put another way, the device 310 may again select and request the representation indicated by the manifest 308c as having the segment with the highest maximum bandwidth that does not exceed the bandwidth available to the device 310.

The communication flow and process of FIG. 5 may continue as desired. For example, this communication flow and process may continue until the content item has ended and/or until the communication session terminates. The manifest 308 may be updated, as the content item progresses, to indicate the one or more characteristics of upcoming one or more segments of the content. The device 310 may use the updated manifest 308 to determine, on a segment-by-segment basis (or every group of multiple segments, as desired) which representation to use to obtain a transcoded version of the upcoming segment(s) in the content item. Such an updated, dynamic manifest 308 may allow the device 310 to make better decisions as compared with a manifest that statically indicates, for example, a maximum bandwidth of an entire item of content and/or a large portion thereof. By knowing the one or more characteristics (for example, maximum bandwidth requirement) of one or more upcoming segments, the device 310 may be able to obtain an overall higher quality version of the transcoded content 305.

Given a dynamically adjusting bandwidth value in the updated manifests 308, and/or given dynamically adjusting video quality scores in the same manifest (e.g., generated by a video quality measurement algorithm such as SSIM, PSNR, etc.), the device 310 could, knowing its own on-network bandwidth, look at the required bandwidth of all available representations of the content in the manifest 308. Out of all of the potential options not exceeding the available bandwidth on the network, the device 310 could look at the video quality score in the manifest 308 for each representation. If the video quality (e.g., SSIM scores) per each representation are within a certain threshold of each other (for example, within a one-point difference on a 100-point scale), it may be difficult for the Human Visual System (HVS) to discern a noticeable difference between one or another representation. In this case, the device 310 could use the dynamically updated bandwidth values and video quality scores in the manifest 308 to make a decision to, e.g., request a lower or the lowest bandwidth representation out of the available options in the manifest 308. For example, there may be moments in certain content items where there is very little content complexity (e.g., all black video being one of the least complex, but static text on a solid color background could also be considered rather low-complexity, etc.). In these instances, a user of the device 310 may notice very little perceivable difference between black video at 1080p displayed on a 1080p-native device vs black video at 360p, which may need to be scaled up for display where the device 310 might include, e.g., a 1080p-native display device. In this case, the device 310 could decide to request the 360p representation of the content item until a new dynamic manifest 308 suggests a video quality score delta has increased substantially between representations. Upon determining this substantial increase (e.g., beyond a predetermined threshold increase), the device 310 may take this video quality score into account along with the device's 310 bandwidth requirement and/or available bandwidth on the network, and may make an informed decision as to what would be a desirable user experience. Thus, in this case, the device 310 may request the corresponding representation having the desired video quality. This type of process may be considered a quality-driven adaptive bit-rate (ABR) content delivery process.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

The invention claimed is:

1. A method comprising:
   generating, by at least one computing device, a first manifest file indicating, for each of a plurality of segments of a video content item, a corresponding bandwidth value;
   receiving, from a device, a first request, based on the first manifest file, for a first segment of the plurality of segments;
   sending, to the device and based on the first request, the first segment;
   receiving a measurement, taken by the device and taken using a video quality measurement algorithm, of a received video quality of display of the first segment;
   generating a second manifest file by updating, based on the received measurement, the first manifest file to update a bandwidth value corresponding to a file corresponding to a second segment of the plurality of segments;
   receiving, from the device and after sending the second manifest file to the device, a second request, based on the second manifest file, for the second segment of the plurality of segments and a third segment of the plurality of segments; and
   sending, to the device and based on the second request, the second segment and the third segment.

2. The method of claim 1, wherein the plurality of segments comprises a plurality of differently-transcoded segments of a same first portion of the video content item.

3. The method of claim 1, wherein the updated bandwidth value corresponds to less bandwidth utilization as compared to the bandwidth value.

4. The method of claim 1, further comprising:
   publishing the first manifest file and the second manifest file.

5. The method of claim 1, wherein the measurement of the received video quality comprises one or more of:
   a structural similarity index measurement; or
   a peak signal-to-noise ratio measurement.

6. The method of claim 1, wherein the updated bandwidth value corresponds to more bandwidth utilization as compared to the bandwidth value.

7. The method of claim 1, wherein the sending the first segment comprises sending the first segment as part of a fragment.

8. The method of claim 1, wherein the updating the first manifest file further comprises replacing a first fragment length with a second fragment length.

9. The method of claim 1, further comprising:
determining, based on the measurement, a length of a fragment that comprises the second segment,
wherein the sending the second segment comprises sending the fragment.

10. A method comprising:
determining, by at least one computing device, a first data set associating a bandwidth value with each of a plurality of transcoded representations of a video content item;
receiving a first request by a device, the first request indicating a first transcoded representation of the plurality of transcoded representations;
sending, to the device, the first transcoded representation;
receiving a measurement, taken by the device and taken using a video quality measurement algorithm, of a received video quality of display of the first transcoded representation;
generating a second data set by updating, based on the received measurement, the first data set to update a bandwidth value corresponding to a file corresponding to a second transcoded representation of the plurality of transcoded representations;
receiving, from the device and after sending at least a portion of the second data set to the device, a second request:
the second transcoded representation of the plurality of transcoded representations; and
a third transcoded representation of the plurality of transcoded representations; and
sending, based on the second request, the second transcoded representation and the third transcoded representation.

11. The method of claim 10, wherein each of the first data set and the second data set comprises a manifest file.

12. The method of claim 10, further comprising:
publishing the first data set for retrieval by the device; and
publishing the second data set for retrieval by the device.

13. The method of claim 10, wherein each of the plurality of transcoded representations comprises a segment of the video content item.

14. The method of claim 10, wherein the first transcoded representation is associated with a first segment of the video content item, and wherein the second transcoded representation is associated with a second segment, of the video content item, that is subsequent to the first segment.

15. The method of claim 10, further comprising:
determining, based on the measurement, a length of a fragment of the second transcoded representation,
wherein the sending the second transcoded representation comprises sending the fragment.

16. A method comprising:
receiving, by at least one computing device, a first manifest file indicating, for each of a plurality of segments of a video content item, a corresponding bandwidth value;
sending, based on the first manifest file, a first request for a first segment of the plurality of segments;
receiving, based on the first request, the first segment;
sending, by the at least one computing device, a measurement, taken by the at least one computing device and taken using a video quality measurement algorithm, of a quality of display of the first segment received by the at least one computing device;
receiving a second manifest file that comprises an updated version of the first manifest file, wherein the second manifest file was updated based on the measurement of the quality of display of the first segment, and wherein the second manifest file indicates a different bandwidth value for a second segment of the plurality of segments as compared to the first manifest file;
determining, based on the second manifest file and based on a bandwidth needed for pre-fetching the second segment of the plurality of segments, a third bandwidth value;
determining, based on the third bandwidth value, a second request for the second segment of the plurality of segments that identifies:
the second segment of the plurality of segments, and
a third segment of the plurality of segments; and
receiving, based on the second request, the second segment.

17. The method of claim 16, wherein the first manifest file comprises an indication of a first fragment length and the second manifest file comprises an indication of a second fragment length different from the first fragment length.

18. The method of claim 16, wherein the receiving the second segment comprises receiving a fragment, comprising the second segment, having a length that was determined based on the measurement.

* * * * *